United States Patent
Liao

(10) Patent No.: US 9,573,642 B2
(45) Date of Patent: Feb. 21, 2017

(54) SEAT STRUCTURE WITH FUNCTION OF SUSPENSION

(75) Inventor: Yuanhong Liao, Dongguan (CN)

(73) Assignee: QUEST COMPOSITE TECHNOLOGY CORPORATION, Dongguan (CN)

(*) Notice: Subject to any disclaimer, the term of this patent is extended or adjusted under 35 U.S.C. 154(b) by 0 days.

(21) Appl. No.: 14/424,034

(22) PCT Filed: Aug. 30, 2012

(86) PCT No.: PCT/CN2012/080751
§ 371 (c)(1),
(2), (4) Date: Feb. 26, 2015

(87) PCT Pub. No.: WO2014/032245
PCT Pub. Date: Mar. 6, 2014

(65) Prior Publication Data
US 2015/0217824 A1    Aug. 6, 2015

(51) Int. Cl.
*B62J 1/18* (2006.01)
*B62J 1/10* (2006.01)
*B62J 1/08* (2006.01)
*B62J 1/02* (2006.01)

(52) U.S. Cl.
CPC .. *B62J 1/10* (2013.01); *B62J 1/02* (2013.01); *B62J 1/08* (2013.01); *B62J 1/18* (2013.01)

(58) Field of Classification Search
CPC ....................................... B62J 1/08; B62J 1/00
USPC .............................................. 297/214, 25.15
See application file for complete search history.

(56) References Cited

U.S. PATENT DOCUMENTS

| | | | |
|---|---|---|---|
| 4,440,440 A * | 4/1984 | Juy | B62J 1/08 297/215.14 |
| 5,383,706 A * | 1/1995 | Chen | B62J 1/08 297/195.1 |
| 5,466,042 A * | 11/1995 | Herman | B62J 1/08 297/195.1 |
| 5,501,506 A * | 3/1996 | Kao | B62J 1/08 297/215.15 |
| 5,649,738 A * | 7/1997 | Thomson | B62J 1/08 297/195.1 |
| 5,664,829 A * | 9/1997 | Thomson | B62J 1/08 297/195.1 |
| 5,921,625 A * | 7/1999 | Muser | B62J 1/00 297/215.13 |
| 6,702,376 B1 * | 3/2004 | Shen | B62J 1/00 248/371 |

(Continued)

*Primary Examiner* — David R Dunn
*Assistant Examiner* — Alexander Harrison
(74) *Attorney, Agent, or Firm* — Leong C. Lei

(57) ABSTRACT

A seat structure with function of suspension includes a seat tube and a cushion body installed on the seat tube. The seat tube and cushion body are made of carbon-fiber materials. The cushion body includes an integrated seat and a bracket. The bracket is installed on the seat tube. The bracket is an arc piece. The front end of the bracket and the front end of the seat are integrally molded and connected to form a first angle. The rear end of the bracket and the rear end of the seat are integrally molded and connected to form a second angle. The first angle and the second angle are less than 90°, thereby enabling the seat being good elasticity relative to the bracket, which can effectively reduce the vibration transferred from the seat tube. The seat structure has larger elasticity coefficient and better effect of damping.

3 Claims, 2 Drawing Sheets

(56) References Cited

U.S. PATENT DOCUMENTS

| | | | | |
|---|---|---|---|---|
| 7,559,603 B1* | 7/2009 | Chiang | | B62J 1/08 297/215.14 |
| 7,559,604 B2* | 7/2009 | Beaulieu | | B62J 1/08 297/215.14 |
| 7,621,595 B1* | 11/2009 | Chen | | B62J 1/08 297/215.13 |
| 7,997,645 B2* | 8/2011 | Tseng | | B62J 1/08 297/215.1 |
| 8,226,058 B2* | 7/2012 | Chen | | B62J 1/08 248/219.4 |
| 8,267,470 B2* | 9/2012 | Hsu | | B62J 1/08 297/215.14 |
| 8,764,106 B2* | 7/2014 | Bigolin | | B62J 1/007 297/215.13 |
| 8,814,264 B2* | 8/2014 | Bourgeois | | B62J 1/08 297/215.14 |
| 8,894,141 B2* | 11/2014 | Tisue | | B62J 1/08 297/205 |
| 2005/0200170 A1* | 9/2005 | Liao | | B62J 1/08 297/215.15 |
| 2007/0182225 A1* | 8/2007 | Bigolin | | B62J 1/08 297/215.13 |
| 2010/0019553 A1* | 1/2010 | Yu | | B62J 1/20 297/214 |
| 2011/0127813 A1* | 6/2011 | Kim | | B62J 1/08 297/215.15 |
| 2011/0221245 A1* | 9/2011 | Kim | | B62J 1/08 297/215.15 |
| 2011/0241390 A1* | 10/2011 | Tsai | | B62J 1/08 297/215.15 |
| 2012/0126590 A1* | 5/2012 | Hsu | | B62J 1/10 297/215.15 |
| 2012/0181824 A1* | 7/2012 | Hsu | | B62J 1/08 297/215.15 |
| 2013/0207424 A1* | 8/2013 | Choi | | B62J 1/04 297/215.15 |
| 2016/0001835 A1* | 1/2016 | Wodjewodzki | | B62J 1/02 297/215.15 |

* cited by examiner

SEAT STRUCTURE WITH FUNCTION OF SUSPENSION

TECHNICAL FIELD OF THE INVENTION

The present invention relates to a seat structure, and more particularly to a seat structure with function of suspension.

DESCRIPTION OF THE PRIOR ART

A seat structure is an important part of a bike. A conventional seat structure comprises a seat tube and a cushion body installed on the seat tube. The cushion body comprises a seat and a bracket installed to the bottom of the seat. The cushion body is installed on the seat tube through the bracket.

However, the seat and the bracket of the cushion body are separate configurations. The elasticity of the seat relative to the bracket is bad, so the effect of damping of the cushion body is not good. In order to reduce the vibration transferred from the seat tube, a shock absorber is provided between the cushion body and the seat tube. This way enhances the effect of damping and provides conform for the user to sit on the cushion body. However, this way increases parts and is inconvenient for assembly to cause lower assembly efficiency. Accordingly, the inventor of the present invention has devoted himself based on his many years of practical experiences to solve these problems.

SUMMARY OF THE INVENTION

The primary object of the present invention is to provide a seat structure with function of suspension to solve the problem of the conventional seat structure which has many parts and is inconvenient for assembly to cause lower assembly efficiency.

In order to achieve the aforesaid object, the seat structure with function of suspension of the present invention comprises a seat tube and a cushion body installed on the seat tube. The seat tube and the cushion body are made of carbon-fiber materials. The cushion body comprises an integrated seat and a bracket. The bracket is installed on the seat tube. The bracket is an arc piece. The front end of the bracket and the front end of the seat are integrally molded and connected to form a first angle. The rear end of the bracket and the rear end of the seat are integrally molded and connected to form a second angle. Both the first angle and the second angle are less than 90°.

Preferably, the cushion body is installed on the seat tube through two adjustment bolts to adjust the position of the cushion body.

Preferably, a top face of the seat tube is formed with two elongate fixing holes, the bracket is provided with an upper gasket, the upper gasket is formed with an elongate slot, and the adjustment bolts pass through the respective elongate fixing holes and the elongate slot to be threadedly connected with fixing nuts.

Preferably, a lower adjustment chuck is provided between a bottom face of the bracket and the top face of the seat tube, the lower adjustment chuck includes a curved portion and two fixing portions extending levelly from two ends of the curved portion, the top face of the seat tube is formed with a curved recess corresponding to the curved portion, the curved portion is engaged in the curved recess, and the two fixing portions are formed with elongate through holes for the adjustment bolts to pass therethrough.

Preferably, each fixing portion is provided with an insertion portion protruding outward around the periphery of its elongate through hole, and the insertion portion passes through the bracket and the elongate slot of the upper gasket in sequence bottom-up.

Preferably, the seat tube is formed with an accommodation room, and a head of each adjustment bolt is received in the accommodation room.

Preferably, a spacer is provided between a bottom face of the accommodation room and the head of each adjustment bolt.

Compared to the prior art, the present invention has obvious advantages and beneficial effects as follows:

1. The front end of the bracket and the front end of the seat are integrally molded and connected to form the first angle. The rear end of the bracket and the rear end of the seat are integrally molded and connected to form a second angle. The first angle and the second angle are less than 90°, enabling the seat to have good elasticity relative to the bracket, which can effectively reduce the vibration transferred from the seat tube. The seat structure of the present invention has larger elasticity coefficient and better effect of damping, replacing the traditional bracket and the seat which are separately connected and need to install shock absorbers. The present invention requires fewer parts, has a simple structure, and is advantageous in enhancing the efficiency of production assembly.

2. Through the two adjustment bolts, the front and rear position of the cushion body is adjustable to be mounted the seat tube, such that the user can adjust the position of the cushion body forward or rearward as desired to get a better comfort. The present invention provides great convenience for the user.

DETAILED DESCRIPTION OF THE PREFERRED EMBODIMENTS

Embodiments of the present invention will now be described, by way of example only, with reference to the accompanying drawings.

Figure 1:
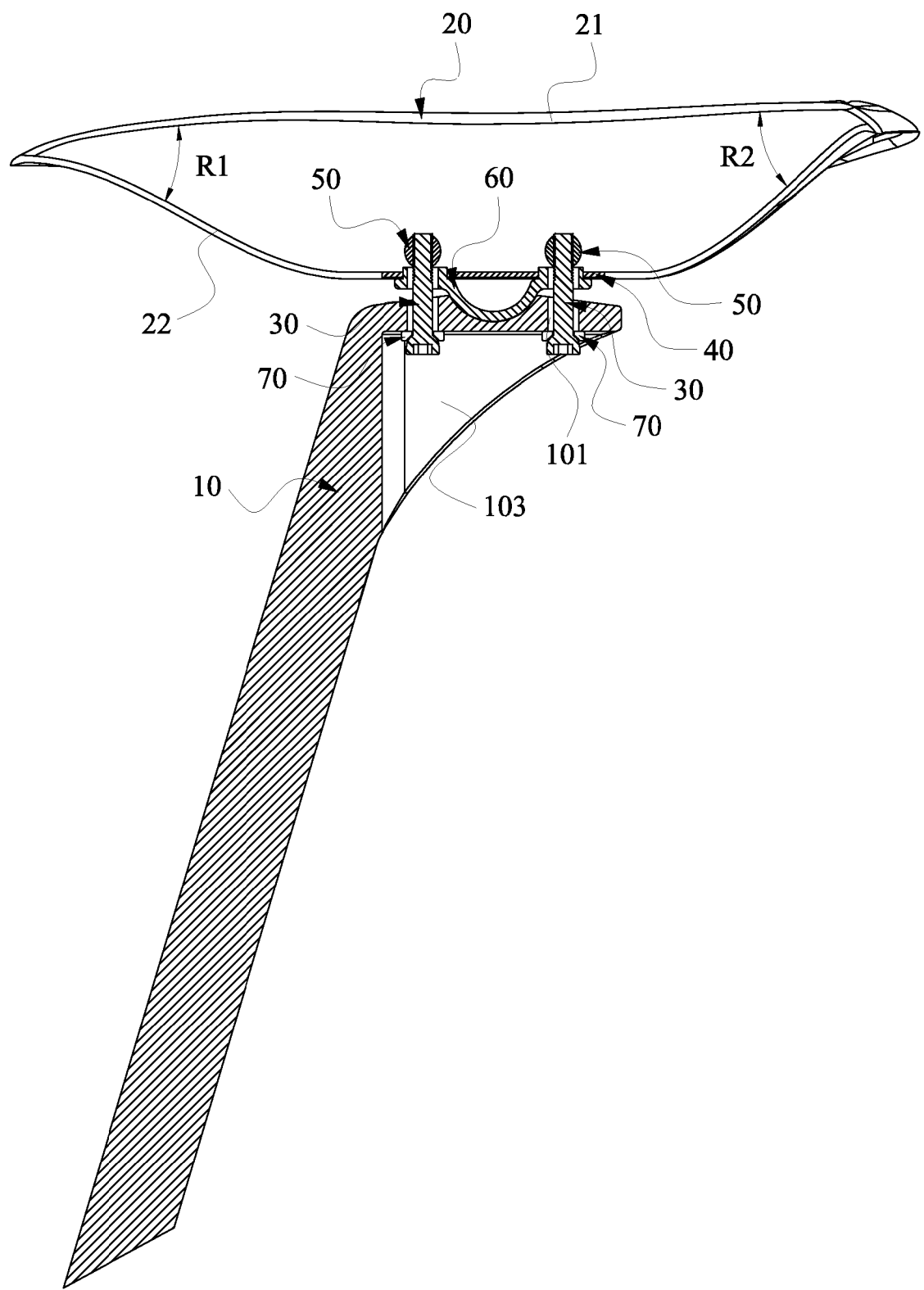
FIG. 1 is a sectional view according to a preferred embodiment of the present invention.
Figure 2:
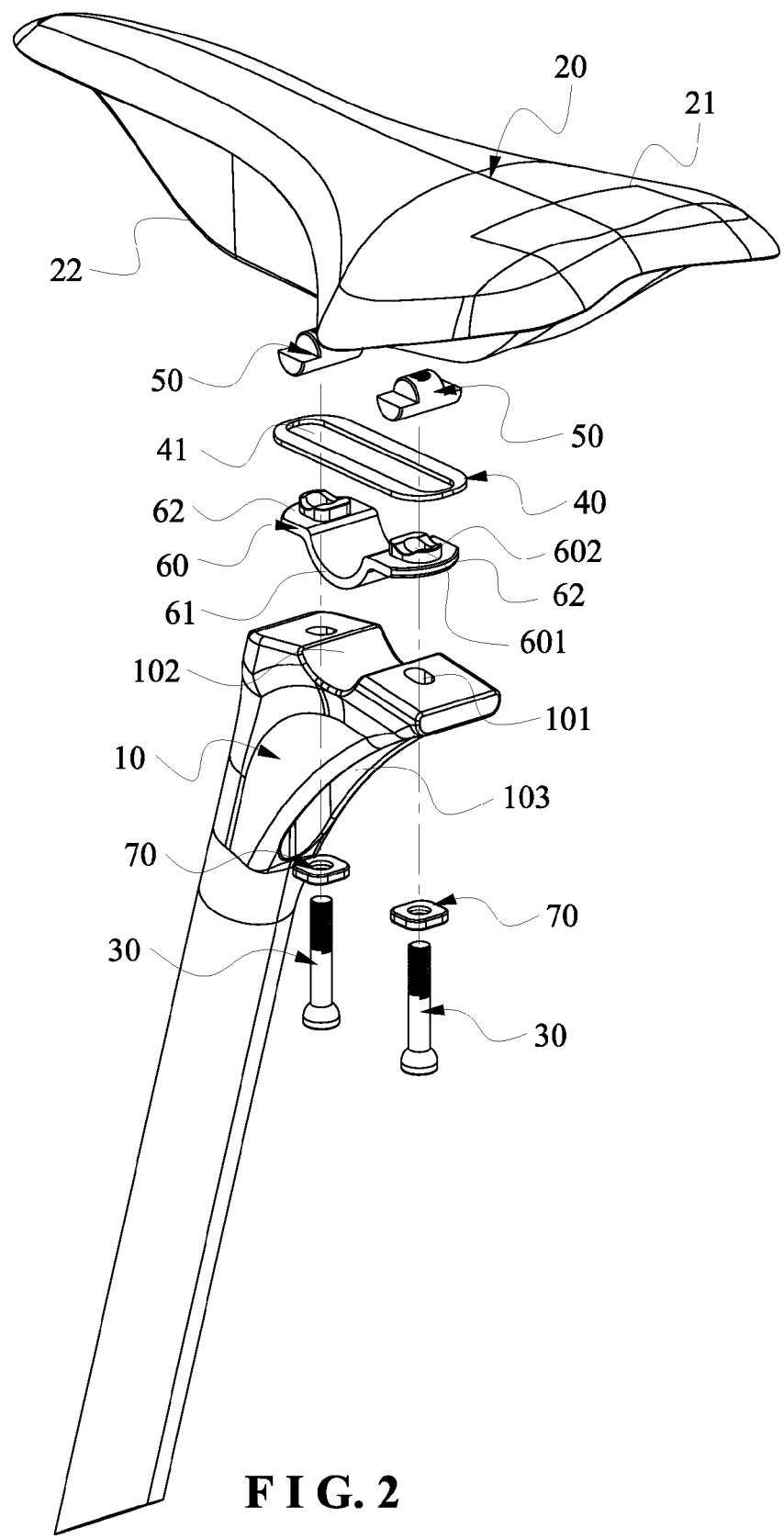
FIG. 2 is an exploded view according to the preferred embodiment of the present invention.

Referring to FIG. 1 and FIG. 2, the present invention discloses a seat structure with function of suspension. According to a preferred embodiment, the present invention comprises a seat tube 10 and a cushion body 20 installed on the seat tube 10. The seat tube 10 and the cushion body 20 are made of carbon-fiber materials. The cushion body 20 comprises an integrated seat 21 and a bracket 22. The bracket 22 is installed on the seat tube 10. The bracket 22 is an arc piece. The front end of the bracket 22 and the front end of the seat 21 are integrally molded and connected to form a first angle R1. The rear end of the bracket 22 and the rear end of the seat 21 are integrally molded and connected to form a second angle R2. Both the first angle R1 and the second angle R2 are less than 90°, thereby enabling the seat 21 to have good elasticity relative to the bracket 22.

In this embodiment, the cushion body 20 is installed on the seat tube 10 through two adjustment bolts 30 to adjust its front and rear position. The top face of the seat tube 10 is formed with two elongate fixing holes 101. The bracket 22 is provided with an upper gasket 40. The upper gasket 40 is formed with an elongate slot 41. The adjustment bolts 30 pass through the respective elongate fixing holes 101 and the elongate slot 41 to be threadedly connected with fixing nuts 50. In this embodiment, a lower adjustment chuck 60 is provided between the bottom face of the bracket 22 and the top face of the seat tube 10. The lower adjustment chuck 60 includes a curved portion 61 and two fixing portions 62 extending levelly from two ends of the curved portion 61. The top face of the seat tube 10 is formed with a curved recess 102 corresponding to the curved portion 61. The curved portion 61 is engaged in the curved recess 102. The two fixing portions 62 are formed with elongate through holes 601 for the adjustment bolts 30 to pass therethrough. Each fixing portion 62 is provided with an insertion portion 602 protruding outward around the periphery of the elongate through hole 601. The insertion portion 602 passes through the bracket 22 and the elongate slot 41 of the upper gasket 40 in sequence bottom-up.

The seat tube 10 is formed with an accommodation room 103. The head of each adjustment bolt 30 is received in the accommodation room 103. A spacer 70 is provided between the bottom face of the accommodation room 103 and the head of each adjustment bolt 30.

The assembly process of this embodiment is described hereinafter. First, the upper gasket 40 is embedded and positioned in the bracket 22. The curved portion 61 of the lower adjustment chuck 60 is engaged in the curved recess 102. The insertion portions 602 of the fixing portions 62 pass through the bracket 22 and the elongate slot 41 of the upper gasket 40. The adjustment bolts 30 pass through the elongate fixing holes 101, the elongate through holes 601, the bracket 22, and the elongate slot 41 in sequence to be connected with the nuts 50, such that the cushion body 20 is fixed to the seat tube 10, as shown in FIG. 1. When the user wants to adjust the front and rear position of the cushion body 20, the nuts 50 are unscrewed for adjusting the cushion body 20 to a desired position, and then the nuts 50 are screwed again.

The feature of the present invention is that the front end of the bracket and the front end of the seat are integrally molded and connected to form the first angle. The rear end of the bracket and the rear end of the seat are integrally molded and connected to form a second angle. The first angle and the second angle are less than 90°, thereby enabling the seat to have good elasticity relative to the bracket, which can effectively reduce the vibration transferred from the seat tube. The seat structure of the present invention has larger elasticity coefficient and better effect of damping, replacing the traditional bracket and the seat which are separately connected and need to install shock absorbers. The present invention requires fewer parts, has a simple structure, and is advantageous in enhancing the efficiency of production assembly. Furthermore, through the two adjustment bolts, the front and rear position of the cushion body is adjustable to be mounted the seat tube, such that the user can adjust the position of the cushion body forward or rearward as desired to get a better comfort. The present invention provides great convenience for the user.

Although particular embodiments of the present invention have been described in detail for purposes of illustration, various modifications and enhancements may be made without departing from the spirit and scope of the present invention. Accordingly, the present invention is not to be limited except as by the appended claims.

I claim:

1. A seat structure with function of suspension, comprising a seat tube and a cushion body installed on the seat tube, the seat tube and the cushion body being made of carbon-fiber materials, the cushion body comprising an integrated seat and a bracket, the bracket being installed on the seat tube, the bracket being an arc piece, a front end of the bracket and a front end of the seat being integrally molded and connected to form a first angle, a rear end of the bracket and a rear end of the seat being integrally molded and connected to form a second angle, both the first angle and the second angle being less than 90°, wherein the cushion body is installed on the seat tube through two adjustment bolts to adjust the position of the cushion body, a top face of the seat tube is formed with two elongate fixing holes, the bracket is provided with an upper gasket, the upper gasket is formed with an elongate slot, and the adjustment bolts pass through the respective elongate fixing holes and the elongate slot to be threadedly connected with fixing nuts, a lower adjustment chuck is provided between a bottom face of the bracket and the top face of the seat tube, the lower adjustment chuck includes a curved portion and two fixing portions extending levelly from two ends of the curved portion, the top face of the seat tube is formed with a curved recess corresponding to the curved portion, the curved portion is engaged in the curved recess, and the two fixing portions are formed with elongate through holes for the adjustment bolts to pass therethrough, each of the fixing portions is provided with an insertion portion protruding outward around the periphery of each of the elongate through holes, and the insertion portion passes through the bracket and the elongate slot of the upper gasket.

2. The seat structure with function of suspension as claimed in claim 1, wherein the seat tube is formed with an accommodation room, and a head of each adjustment bolt is received in the accommodation room.

3. The seat structure with function of suspension as claimed in claim 2, wherein a spacer is provided between a bottom face of the accommodation room and the head of each adjustment bolt.

* * * * *